US012572765B2

(12) United States Patent
Yang et al.

(10) Patent No.: US 12,572,765 B2
(45) Date of Patent: Mar. 10, 2026

(54) OPTICAL DECODING DEVICE WHICH CAN DECODE INVISIBLE CODE AND COLOR CODE

(71) Applicant: PixArt Imaging Inc., Hsin-Chu City (TW)

(72) Inventors: Shu-Sian Yang, Hsin-Chu City (TW); Tsung-Hsueh Lee, Hsin-Chu City (TW); Tzu-Yu Chen, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 0 days.

(21) Appl. No.: 18/823,721

(22) Filed: Sep. 4, 2024

(65) Prior Publication Data

US 2025/0148236 A1      May 8, 2025

Related U.S. Application Data

(60) Provisional application No. 63/596,310, filed on Nov. 6, 2023.

(51) Int. Cl.
| | |
|---|---|
| *G08C 21/00* | (2006.01) |
| *G06K 7/10* | (2006.01) |
| *G06K 7/14* | (2006.01) |

(52) U.S. Cl.
CPC ..... *G06K 7/10762* (2013.01); *G06K 7/10861* (2013.01); *G06K 7/1413* (2013.01)

(58) Field of Classification Search
CPC ............. G06K 19/0772; G06K 7/1417; G06K 7/10366; G06K 7/10672; G06K 7/10861; G06K 7/1413

USPC ........................... 235/462.07, 462.09, 462.1
See application file for complete search history.

(56) References Cited

U.S. PATENT DOCUMENTS

| | | | | |
|---|---|---|---|---|
| 10,111,470 | B2 * | 10/2018 | Monsees .............. | H05B 1/0244 |
| 2015/0208723 | A1 * | 7/2015 | Glazer ...................... | F23Q 7/14 |
| | | | | 434/238 |
| 2015/0282527 | A1 * | 10/2015 | Henry, Jr. ................. | G01F 1/28 |
| | | | | 131/328 |
| 2019/0350257 | A1 * | 11/2019 | Sur ...................... | H05B 1/0227 |
| 2021/0007407 | A1 * | 1/2021 | Czapar .................... | A24F 40/57 |

FOREIGN PATENT DOCUMENTS

| | | | | |
|---|---|---|---|---|
| CN | 212971660 | * | 4/2021 | ......... G06K 7/10762 |

* cited by examiner

*Primary Examiner* — Daniel St Cyr
(74) *Attorney, Agent, or Firm* — Winston Hsu

(57) ABSTRACT

An optical decoding device, comprising: an image sensor, configured to sense first sensing images and second sensing images; a processing circuit, configured to determine a relative movement between the optical decoding device and an object according to the first sensing images; and a decoding device, configured to decode the second sensing images in a first mode to generate a decoding result and does not decode the second sensing images in a second mode. The decoding device switches between the first mode and the second mode according to the relative movement, thus can save power. A barcode, a color code which can be provided on a curved surface and an invisible code are also disclosed. An electrical cigarette lighter using the optical decoding device to provide heat is also disclosed.

20 Claims, 10 Drawing Sheets

OPTICAL DECODING DEVICE WHICH CAN DECODE INVISIBLE CODE AND COLOR CODE

CROSS REFERENCE TO RELATED APPLICATIONS

This application claims the benefit of U.S. Provisional Application No. 63/596,310, filed on Nov. 6, 2023. The content of the application is incorporated herein by reference.

BACKGROUND OF THE INVENTION

1. Field of the Invention

The present invention relates to an optical decoding device which can decode an invisible code and a color code. The present invention particularly relates to an optical decoding device which can be applied to an electrical cigarette lighter, can decode the invisible code, the color code and can reduce power consumption.

2. Description of the Prior Art

Electronic cigarette lighters are quite convenient for smokers because smokers do not need to use traditional lighters that may leak fuel or easily cause burns. However, traditional electronic cigarette lighters require users to make different settings for different cigarettes. Otherwise, they may not be able to light the cigarette smoothly or at the optimal temperature, which will affect the smell of the cigarette when it is lit.

SUMMARY OF THE INVENTION

One objective of the present invention is to provide an optical decoding device which comprises a decoding device and can save power.

One embodiment of the present invention discloses an optical decoding device, comprising: an image sensor, configured to sense first sensing images and second sensing images; a processing circuit, configured to determine a relative movement between the optical decoding device and an object according to the first sensing images; and a decoding device, configured to decode the second sensing images in a first mode to generate a decoding result and does not decode the second sensing images in a second mode. The decoding device switches between the first mode and the second mode according to the relative movement. In one embodiment, the optical decoding device is applied to an electrical cigarette lighter.

The above-mentioned decoding device may be used to decode a color code. The color code may comprise: a location region with a first color; a plurality of code regions, wherein each one of the code regions comprises a first sub code region and a second sub code region; wherein in each of the code regions, at least one of the first sub code region and the second sub code region has a second color; wherein a code value of each one of the code regions is determined by which one of the first sub code region and the second sub code region thereof has the second color.

The above-mentioned decoding device may be used to decode a code. The code may comprise: at least one location region, for locating the code, wherein each one of the code regions comprises a sub code region representing a first code value, wherein the first code value of each of the code regions is determined according to a position of at least one of the sub code region in the code regions.

In view of above-mentioned embodiments, the electrical cigarette lighter may properly heat the cigarette and no manual setting is needed. Also, an optical decoding device which has a decoding device and can save power, a color code which can be provided on a curved surface and an invisible code are provided. Accordingly, the issues of prior art can be improved.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. It will be appreciated that the term "first", "second", "third" in following descriptions are only for the purpose of distinguishing different one elements, and do not mean the sequence of the elements. For example, a first device and a second device only mean these devices can have the same structure but are different devices.

Figure 1A:
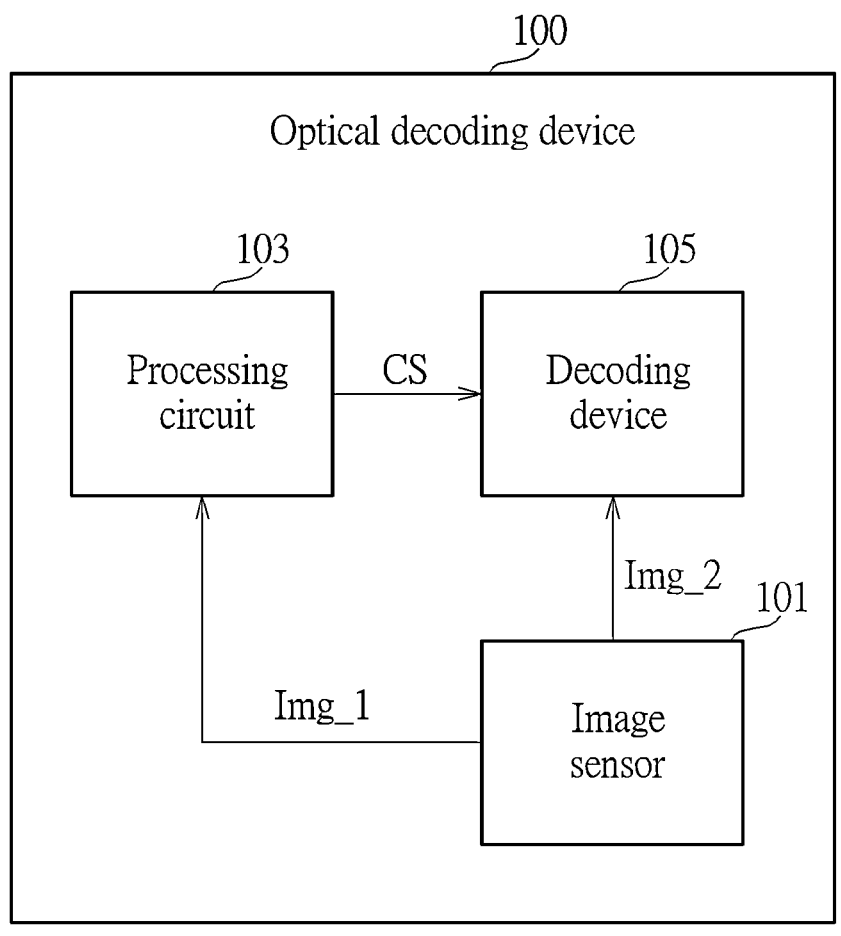
FIG. 1A is a block diagram illustrating an optical decoding device according to one embodiment of the present invention.

FIG. 1A is a block diagram illustrating an optical decoding device 100 according to one embodiment of the present invention. As shown in FIG. 1A, the optical decoding device 100 comprises an image sensor 101, a processing circuit 103 and a decoding device 105. The image sensor 101 is configured to sense first sensing images Img_1 and second sensing images Img_2. The processing circuit 103 is configured to determine a relative movement between the optical decoding device 100 and an object according to the first sensing images Img_1. For example, in one embodiment, the optical decoding device 100 is applied to an optical mouse and the object is a working surface on which the optical decoding device 100 is provided on. For another example, in one embodiment, the optical decoding device 100 is applied to an optical touch control device and the object is a finger or a stylus on the optical decoding device 100. The decoding device 105 is configured to decode the second sensing images Img_2 in a first mode to generate a decoding result, and does not decode the second sensing images Img_2 in a second mode. The decoding device 105 switches between the first mode and the second mode according to the relative movement.

In one embodiment, the first sensing images Img_1 and the second sensing images Img_2 are generated using the same parameters, that is, the first sensing images Img_1 and the second sensing images Img_2 are identical sensing images. In another embodiment, the first sensing images Img_1 and the second sensing images Img_2 are generated using different parameters. For example, the first sensing images Img_1 and the second sensing images Img_2 are generated by using different brightness, different resolutions or different numbers of pixel circuits of the image sensor 101.

Specifically, in one embodiment, the processing circuit 103 controls the optical decoding device 100 to switch between a third mode and a fourth mode according to the relative movement. A power consumption of the optical decoding device 100 in the fourth mode is lower than a power consumption of the optical decoding device 100 device in the third mode. For example, the third mode is a normal mode and the fourth mode is a sleep mode. In such case, the processing circuit 103 generates a control signal CS according to which of the third mode and the fourth mode the optical decoding device 100 operates in, to control the decoding device 105 to enter the first mode or the second mode.

Figure 1B:
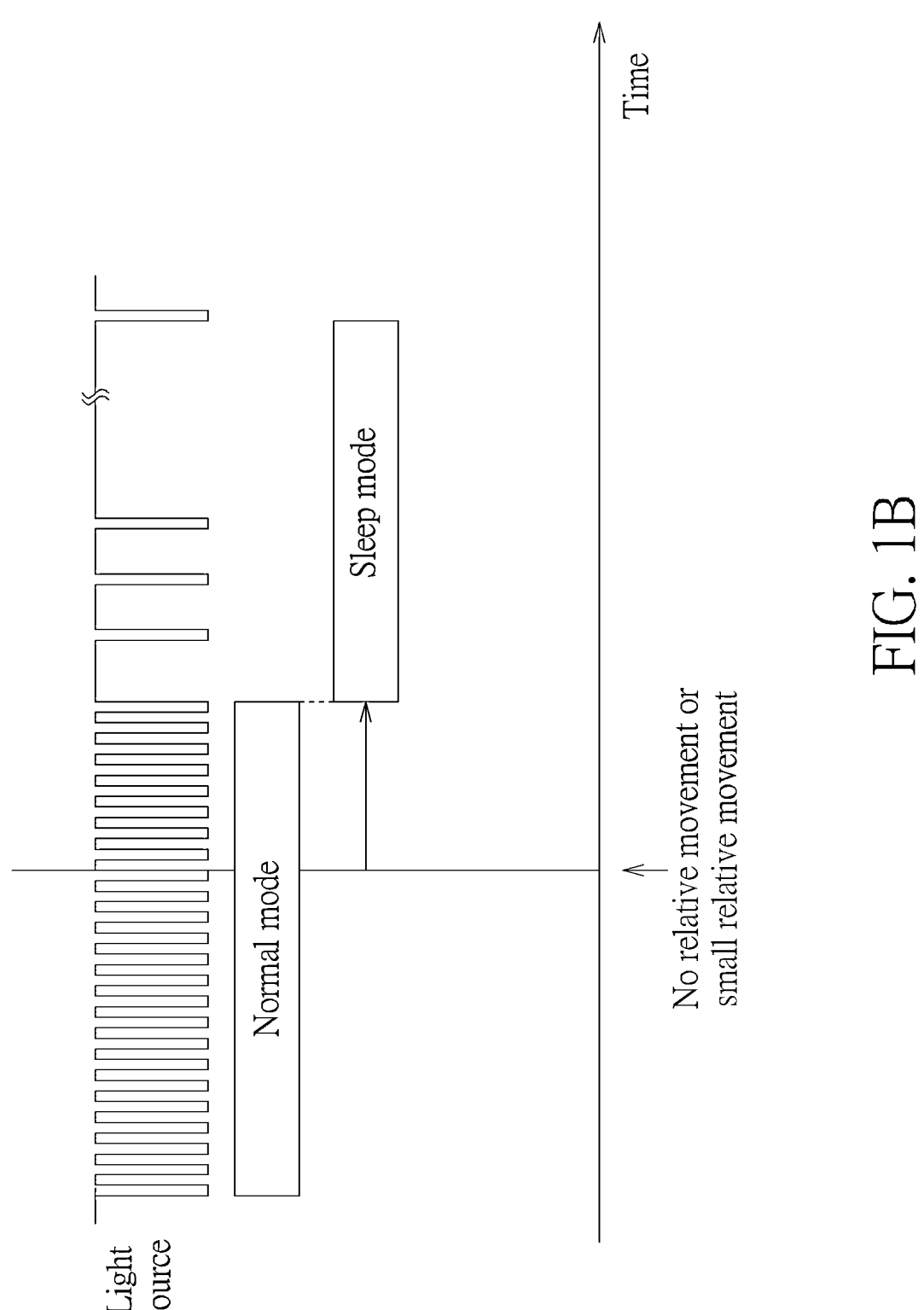
FIG. 1B is a schematic diagram illustrating operations of the optical decoding device shown in FIG. 1A, according to one embodiment of the present invention.

FIG. 1B is a schematic diagram illustrating operations of the optical decoding device 100 shown in FIG. 1A, according to one embodiment of the present invention. In the embodiment of FIG. 1B, the optical decoding device 100 is applied to an optical mouse and comprises a light source. In the normal mode, the optical mouse is moving thus the relative movement is larger than a movement threshold, and the luminous frequency of the light source is high thus the power consumption is high. If the relative movement is 0 or smaller than the movement threshold, the mode is switched to a sleep mode. In the sleep mode, the luminous frequency of the light source is low thus the power consumption is low.

Figure 2:
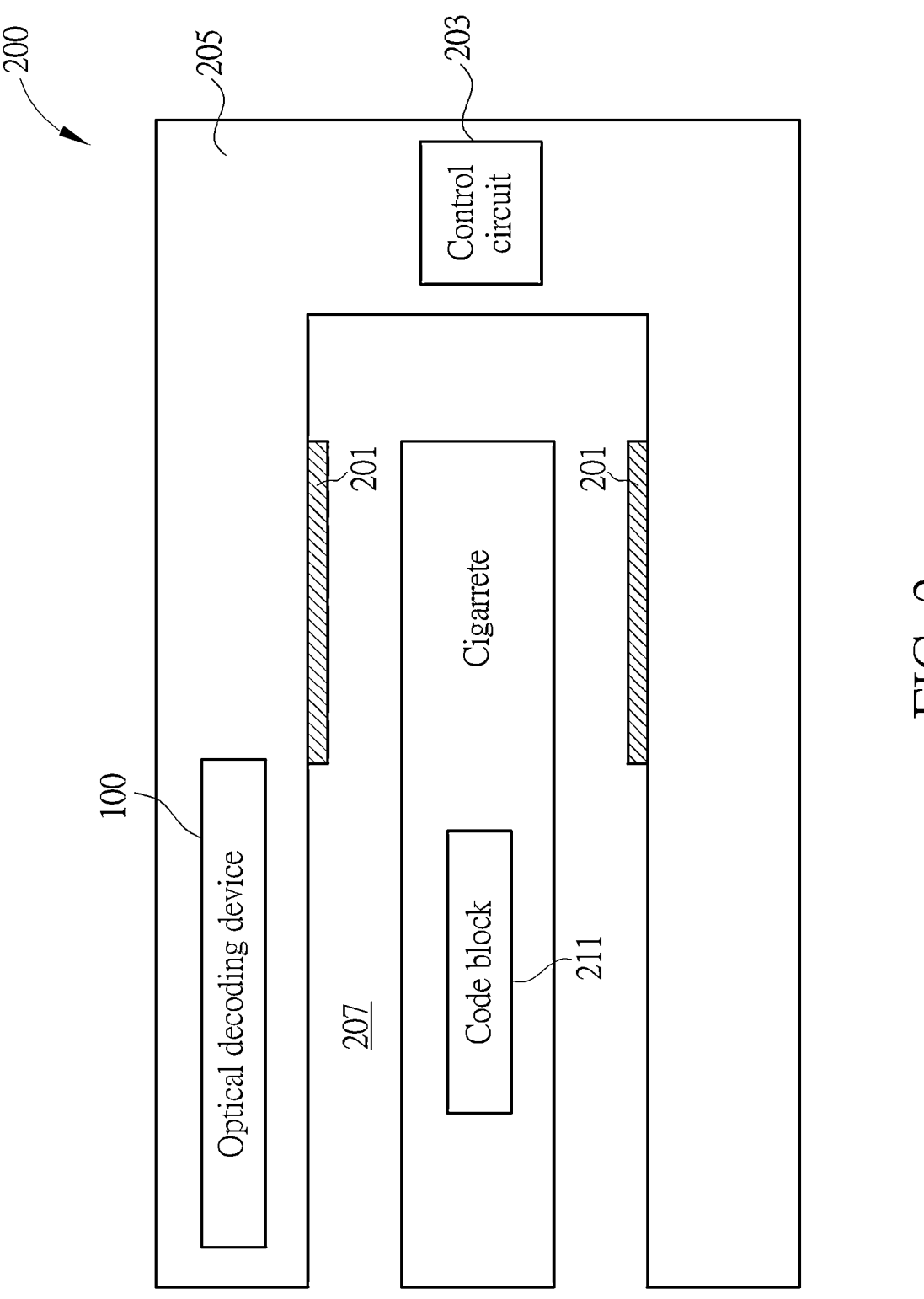
FIG. 2 is a schematic diagram illustrating an electrical cigarette lighter comprising the optical decoding device stated in FIG. 1A and FIG. 1B, according to one embodiment of the present invention.

Besides the above-mentioned optical mouse and the touch control device, the optical decoding device 100 may be applied to other devices. FIG. 2 is a schematic diagram illustrating an electrical cigarette lighter comprising the optical decoding device 100 stated in FIG. 1A and FIG. 1B. As shown in FIG. 2, the electrical cigarette lighter 200 comprises a heating device 201, a control circuit 203, a heating body 205 which forms a chamber 207. If the chamber 207 is empty (i.e., the optical decoding device 100 senses no object), no relative movement is sensed by the optical decoding device 100, thus the decoding device 105 operates in the second mode (the fourth mode of the optical decoding device 100). In such state, the heating device 201 does not provide heat according to the codes from the optical decoding device 100. In one embodiment, the heating device 201 is in a sleep mode in such state. In another embodiment, if the processing circuit 103 determines the cigarette 209 is being removed from the chamber according to the relative movement, the decoding device 105 also operates in the second mode.

If the processing circuit 103 determines the cigarette 209 is plugged into the chamber according to the relative movement, the decoding device 105 switches from the second mode to the first mode. In one embodiment, the optical decoding device 100 operates in the third mode when the decoding device 105 operates in the first mode. In such state, the optical decoding device 100 decodes the code block 211 on the cigarette 209 to generate a decoding result (i.e., to provide codes). In such case, the above-mentioned object is the surface of the cigarette 209. Then, the heating device 201 provides heat according to the decoding result. In one embodiment, the code block 211 comprise codes which represent heating parameters of heating device 201. Accordingly, the heating device 201 can heat the cigarette 209 according to the codes contained in the code block 211. The user does not need to manually set the electrical cigarette lighter 200. In another embodiment, the code block 211 represents at least one cigarette type. In this embodiment, the heating device 201 may set the heating parameter corresponding to the cigarette type. In such case, different cigarette types may correspond to the same heating parameter(s) or different heating parameters.

The control circuit 203 is configured to control the operations of the electrical cigarette lighter 200. In one embodiment, the control circuit 203 is also in a sleep mode in the second mode of the decoding device 105, and in a normal mode in the first mode of the decoding device 105.

Figure 3A:
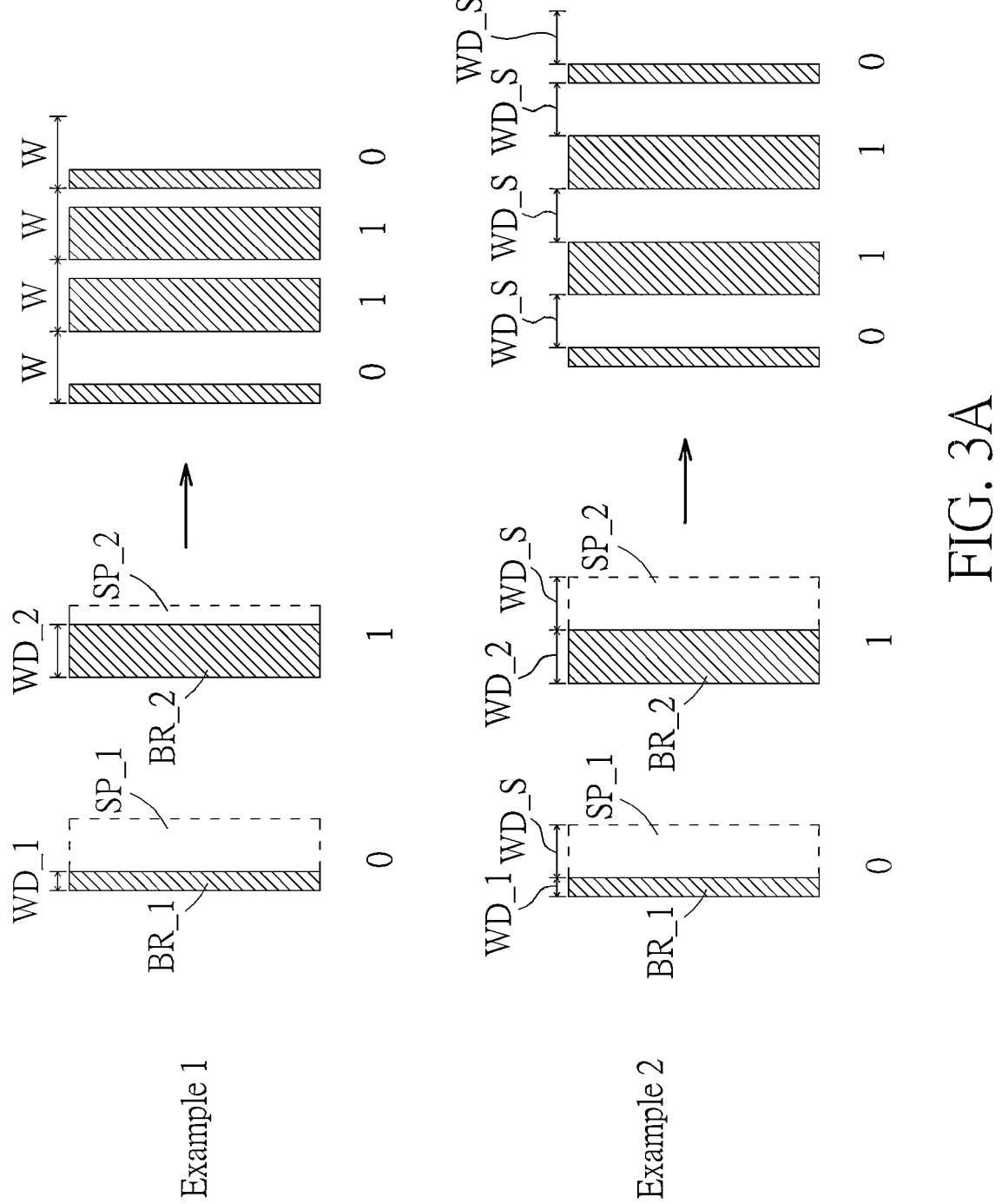
FIG. 3A and FIG. 3B are schematic diagrams illustrating bar codes which can be decoded by the decoding device in FIG. 1A, according to one embodiment of the present invention.
Figure 3B:
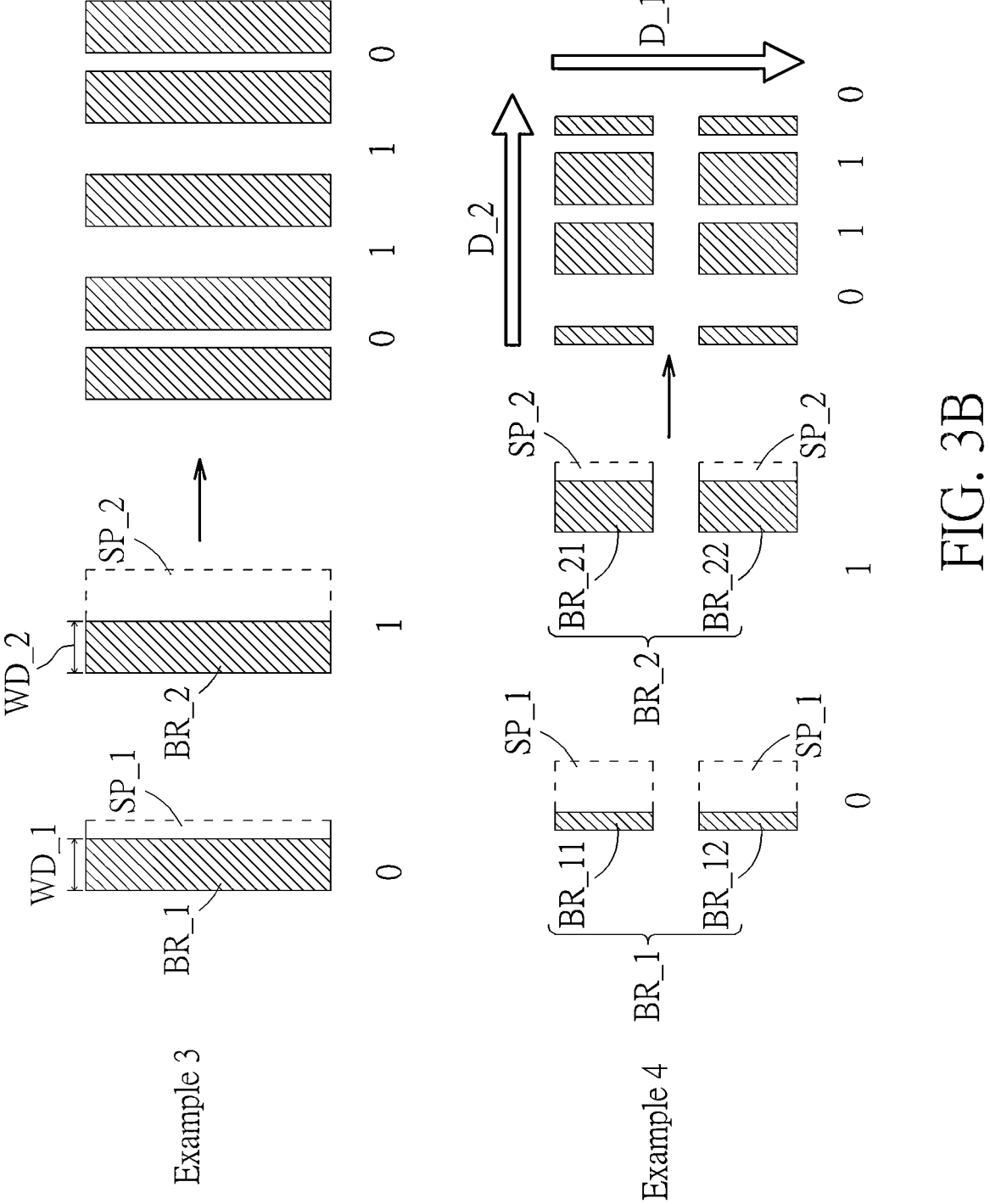

FIG. 3A and FIG. 3B are schematic diagrams illustrating bar codes which can be decoded by the decoding device 105 in FIG. 1A, according to one embodiment of the present invention. FIG. 3A and FIG. 3B comprise four examples. In the embodiments of FIG. 3A and FIG. 3B, the second sensing images Img_2 comprise images of a bar code with at least one first code bar BR_1 and at least one second code bar BR_2, wherein the first code bar BR_1 and the second code bar BR_2 represent different code values. Specifically, in the Example 1, Example 2, Example 3 and Example 4 of FIG. 3A and FIG. 3B, the first code bar BR_1 is a black bar with a code value 0. Also, the second code bar BR_2 is a black bar with a code value 1.

In Example 1, the bar code has a first spacing SP_1 between the first code bar BR_1 and a next code, and has a second spacing SP_2 between the second code bar SP_2 and a next code. A sum of a first width WD_1 of the first code bar BR_1 and the first spacing SP_1 is identical with a sum of a second width WD_2 of the second code bar BR_2 and the second spacing SP_2. For example, in the right diagram of Example 1, the code values of the bar code are 0110. A sum of a width of the code bar and a corresponding spacing of each of the barcodes 0110 are all W.

In Example 2, the bar code has a first spacing SP_1 between the first code bar BR_1 and a next code, and has a second spacing SP_2 between the second code bar SP_2 and a next code. A first width WD_1 of the first code bar BR_1 and a second width WD_2 of the second code bar BR_2 are different. Also, widths of the first spacing SP_1 and the second spacing SP_2 are identical. For example, in the right diagram of Example 2, the code values of the bar code are 0110. The widths of the code bars 0110 are different but widths of the spacing are all WD_S.

In Example 3, the bar code has a first spacing SP_1 between the first code bar BR_1 and a next code, and has a second spacing SP_2 between the second code bar SP_2 and a next code. A first width WD_1 of the first code bar BR_1 and a second width WD_2 of the second code bar BR_2 are identical. Also, widths of the first spacing SP_1 and the second spacing SP_2 are different. For example, in the right diagram of Example 3, the code values of the bar code are 0110. The widths of the code bars of the codes 0110 are identical but widths of corresponding spacing are different.

In Example 4, the bar code has a first spacing SP_1 between the first code bar BR_1 and a next code, and has a second spacing SP_2 between the second code bar BR_2 and a next code. The first code bar BR_1 or the second code bar BR_2 comprises a plurality of discontinuous sub code bars. As shown in Example 4, the first code bar BR_1 comprises discontinuous sub code bars BR_11 and BR_12, and the second code bar BR_2 comprises discontinuous sub code bars BR_21 and BR_22. The sub code bars are distributed in a direction perpendicular to a decoding direction of the bar code. For example, in the right diagram, of Example 4, the code values of the bar code are 0110. Each code bar of the code values 0110 comprises discontinuous sub code bars distributed in the direction D_1, which is perpendicular to a decoding direction D_2.

The bar codes shown in FIG. 3A and FIG. 3B are not limited to be decoded by the decoding device 105 illustrated in FIG. 1A. Besides, the bar codes shown in FIG. 3A and FIG. 3B may be replaced by other codes.

Figure 4:
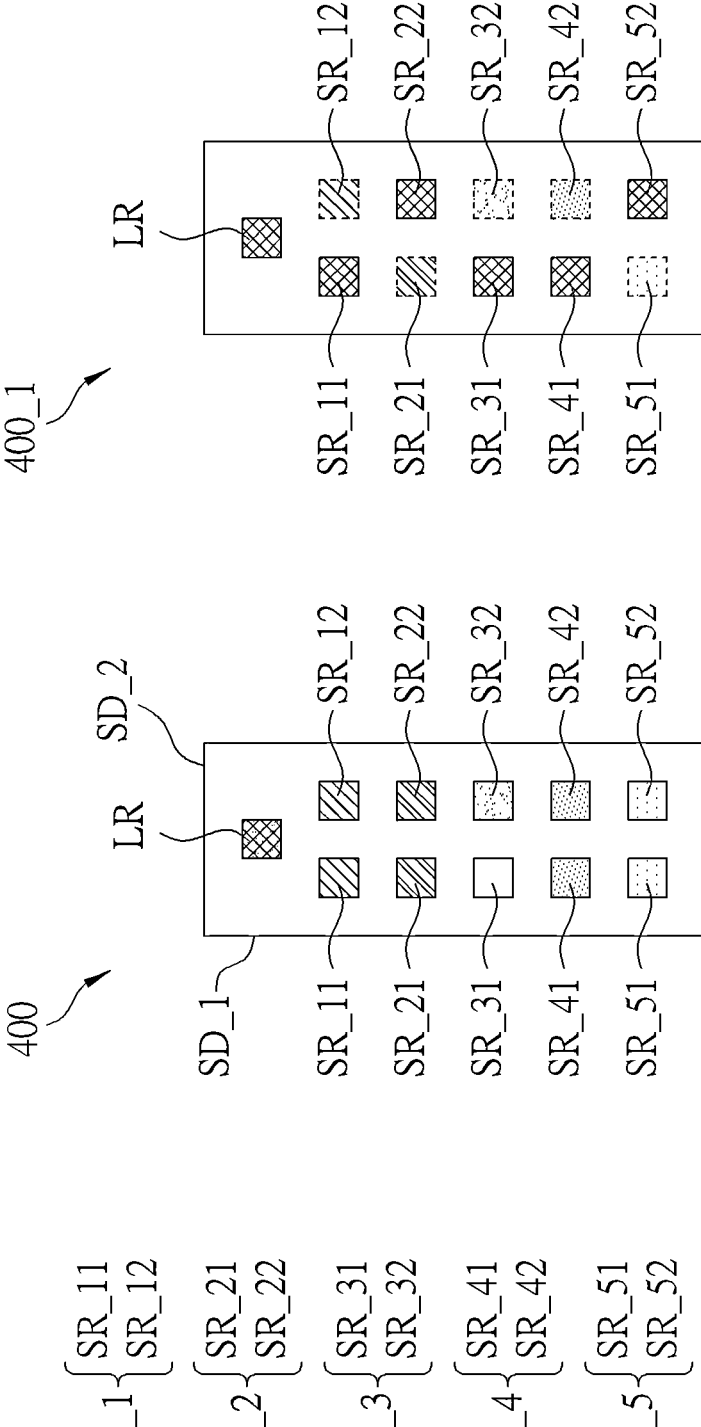
FIG. 4 is a color code which can be decoded by the decoding device in FIG. 1A, according to one embodiment of the present invention.

FIG. 4 is a color code which can be decoded by the decoding device in FIG. 1A, according to one embodiment of the present invention. The embodiment of FIG. 4 discloses a color code 400. The left diagram in FIG. 4 means a color code 400 which is not coded yet, that is, the color code 400 has no code values. The color code 400 comprises a location region LR and a plurality of code regions CR_1 . . . CR_5. Each one of the code regions CR_1 . . . CR_5 comprises a first sub code region and a second sub code region. Specifically, the code regions CR_1 . . . CR_5 respectively comprises first sub code region SR_11 . . . SR_51, and second sub code region SR_12 . . . SR_52, as shown in FIG. 4. Each one of the code regions CR_1 . . . CR_5 may represent a bit.

In one embodiment, the code regions CR_1 . . . CR_5 have different colors, and the sub code regions in the same code region have identical colors. For example, the code regions CR_1 . . . CR_5 are respectively pink, yellow, blue, red and green. In such case, the first sub code region SR_11 . . . SR_51 are respectively pink, yellow, blue, red and green, and the second sub code region SR_12 . . . SR_52 are respectively pink, yellow, blue, red and green. Please note, the background of the color code 400 comprises blocks. However, the background of the color code 400 can be empty.

The location region LR is for locating a decoding direction of the color code 400. The "locating" mentioned here mean "identifying existence of the color code 400". In one embodiment, a decoding direction of the color code 400 is from the location region LR to the code regions CR_1 . . . CR_5. In one embodiment, locations of the first sub code regions and the second sub code regions can be determined according to a position or a shape of the location region LR, thereby the decoding direction can be acquired.

Also, in one embodiment, a distribution of the location region LR and the code regions CR_1 . . . CR_5 follow a first side SD_1 and a distribution of the first sub code region and the second sub code region in a single one of the code region follows a second side SD_2 perpendicular to the first side SD_1. For example, the first sub code region SR_21 and the second sub code region SR_22 in the code region CR_2 follow the second side SD_2. In one embodiment, the first side means a long side of the color code 400 and the second side means a short side of the color code 400, thus the second side is shorter than the first side.

The right diagram of FIG. 4 illustrates a color code 400_1 which has been encoded. That is, some sub code regions are marked by a specific color to represent the code. As shown in FIG. 4, the sub code regions SR_11, SR_22, SR_31, SR_41 and SR_52 are marked by black. On the contrary, original colors of the sub code regions SR_12, SR_21, SR_32, SR_42 and SR_51 are remained. In one embodiment, if the left one of the sub code regions is marked, the code region has a code value 0. Further, if the right one of the sub code regions is marked, the code region has a code value 1.

The color of the location region LR and the color for marking the sub code region may be the same, but can be different as well. Accordingly, the color code 400_1 may be represented as:

A color code, comprising: a location region (e.g., the location region LR) with a first color (e.g., black); a plurality of code regions (e.g., code regions CR_1 . . . CR_5), wherein each one of the code regions comprises a first sub code region and a second sub code region. In each of the code regions, at least one of the first sub code region and the second sub code region has a second color. In one embodiment, one of the first sub code region and the second sub code region has a second color (e.g., the sub code regions SR_11, SR_22, SR_31, SR_41 and SR_52 are black) and the other one of the first sub code region and the second sub code region has a color different from the second color (e.g., the sub code regions SR_12, SR_21, SR_32, SR_42 and SR_51 respectively are pink, yellow, blue, red and green).

Also, a code value of each one of the code regions is determined by which one of the first sub code region and the second sub code region thereof has the second color. For example, if the left one of the sub code regions is marked, the code region has a code value 0. Further, if the right one of the sub code regions is marked, the code region has a code value 1. The first color and the second color may be the same or different. Besides, colors of the first sub code region which does not have the second color and the second sub code region which does not have the second color of different ones of the code regions are different. For example, the sub code regions SR_12, SR_21, SR_32, SR_42 and SR_51 respectively are pink, yellow, blue, red and green. The color code shown in FIG. 4 may still be correctly read even it is provided on a curved surface.

Figure 5:
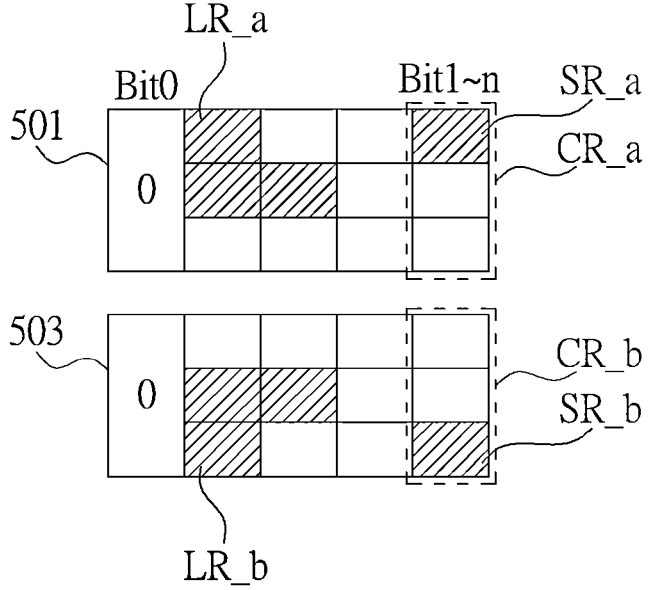
FIG. 5, FIG. 6, FIG. 7 and FIG. 8 are codes which can be decoded by the decoding device in FIG. 1A, according to one embodiment of the present invention.
Figure 5:
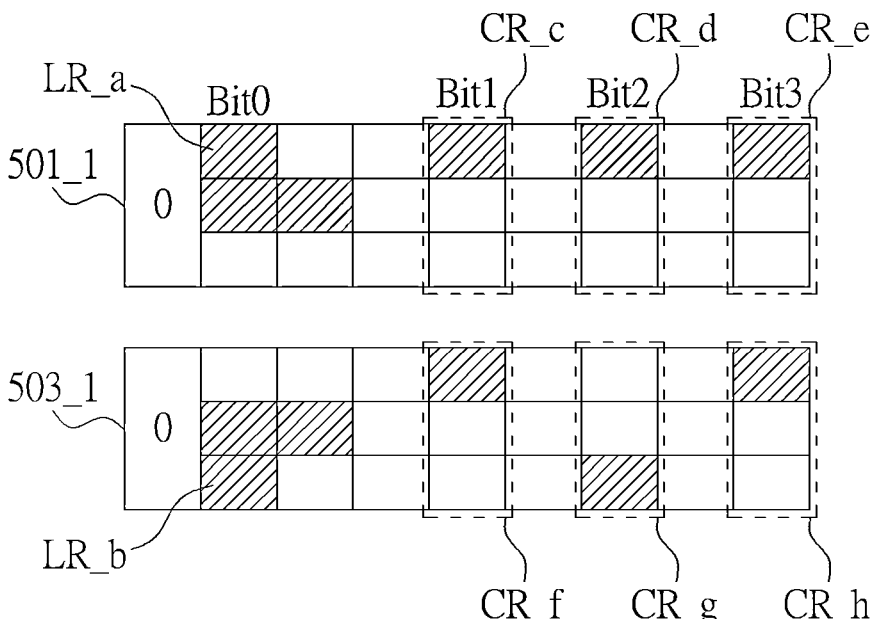

In the embodiments of FIG. 5-FIG. 8, codes which can be invisible are provided. In the embodiment of FIG. 5, the code comprises at least one location region for locating the code regions. Details of the location region will be described for more detail later. The code 501_1 is a more detail code of the code 501.

Further, the code in FIG. 5 comprises a plurality of code regions, wherein each one of the code regions comprises a sub code region representing a first code value, wherein the first code value of each of the code regions is determined according to a position of at least one of the sub code region in the code regions. For example, the code 501 comprises a code region CR_a with a sub code region SR_a, and the code 503 comprises a code region CR_b with a sub code region SR_b. Each code region represents a bit of the code. The decoding direction of the codes in FIG. 5 may be from the location region to the code regions.

In one embodiment, a first code region among the code regions has the first code value with a first value if the sub code region of the first code region is in an upper region of the first code region. For example, the code region CR_a has a code value 0 since the sub code region SR_a is in an upper region of the code region CR_a. Moreover, a second code region among the code region has the first code value with a second value if the sub code region of the second code region is in a lower region of the second code region. For example, the code region CR_b has a code value 1 since the sub code region SR_b is in a lower region of the code region CR_b. Such method can be named as "single location method". Following such rule, the code regions CR_c, CR_d, CR_e of the code 501_1 has code values 000, and the code regions CR_f, CR_g, CR_h of the code 501_1 has code values 010. In such case, the location region may be provided between the upper region and the lower region.

In another embodiment, a method named "differential location method" is used. In such example, the first code value is determined by a relation of positions of the sub code region of two neighboring ones of the code regions. In one embodiment, the first code value of a current code region is 0 if sub code regions of a current code region and a next code region have the same positions. For example, the code value of the code region CR_c is 0 since positions of sub code regions of code regions CR_c and CR_d are the same. On the contrary, the first code value of a current code region is 1 if positions of sub code regions of a current code region and a next code region are different. For example, the code value of the code region CR_f is 1 since positions of sub code regions of code regions CR_f and CR_g are different.

In one embodiment, the above-mentioned location region is for representing a second code value, wherein the second code value is determined according to a shape or a color of the location region. For example, in FIG. 5, the codes 501 and 501_1 respectively comprises location regions LR a, which have the same shape. Accordingly, the second code values of the codes 501 and 501_1 are 0. Following the same rule, the codes 503 and 503_1 respectively comprises location regions LR b, which have the same shape. Accordingly, the second code values of the codes 503 and 503_1 are 1. The code 503_1 is a more detail code of the code 503. In one embodiment, the second code value means a value of Bit0 of the code.

Figure 6:
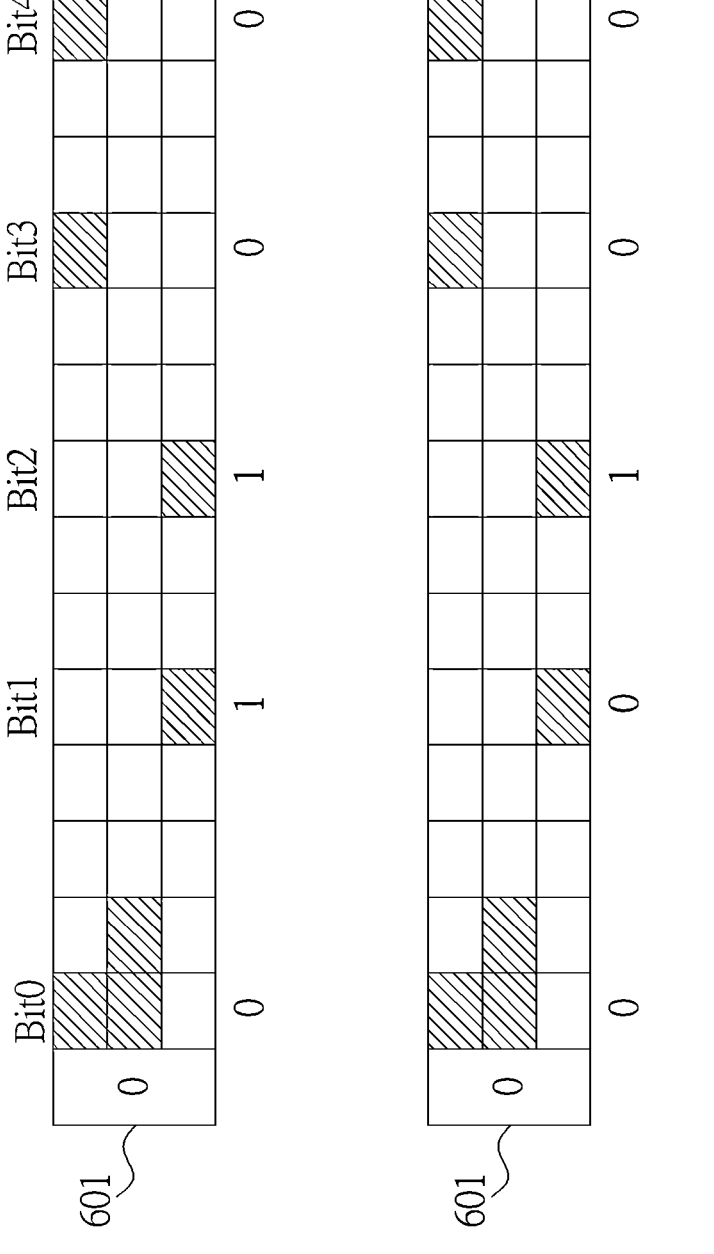

In view of above-mentioned examples, the code may have different code values even if the sub code regions have the same distributions. In the embodiment of FIG. 6, the code 601 has code values 01100 since the above-mentioned "single location method" is used. However, the code 603 has code values 00100 since the above-mentioned "differential location method" is used. Accordingly, the sub code regions of the codes 601, 603 have the same distributions but the codes 601, 603 have different code values.

In the embodiments of FIG. 5 and FIG. 6, only a single line of the code regions are provided in a code. The "single line" mentioned here may mean a region formed by two parallel lines respectively located at a top and a bottom of the location region, but is not limited. For example, in the embodiment of FIG. 7, which may mean an image of the codes shown in FIG. 5 and FIG. 6, the single line is a region formed by two parallel lines PL_1 and PL_2 respectively located at a top and a bottom of the location region. The "single line" may also be defined by other methods. For example, the "single line" means a region formed by two parallel lines with a predetermined distance.

In another embodiment, multiple lines of the code regions may be provided in a code. For example, in the embodiment of FIG. 8, the code regions CR_a1, CR_a2, CR_a3 of a code 800 are located in a first line, and the code regions CR_b1, CR_b2, CR_b3 are located in a second line. In one embodiment, the code regions CR_b1, CR_b2, CR_b3 are located in a second line formed based on the location region CR_b. However, the code 800 may have only one location region rather than multiple location regions.

Figures 7, 8:
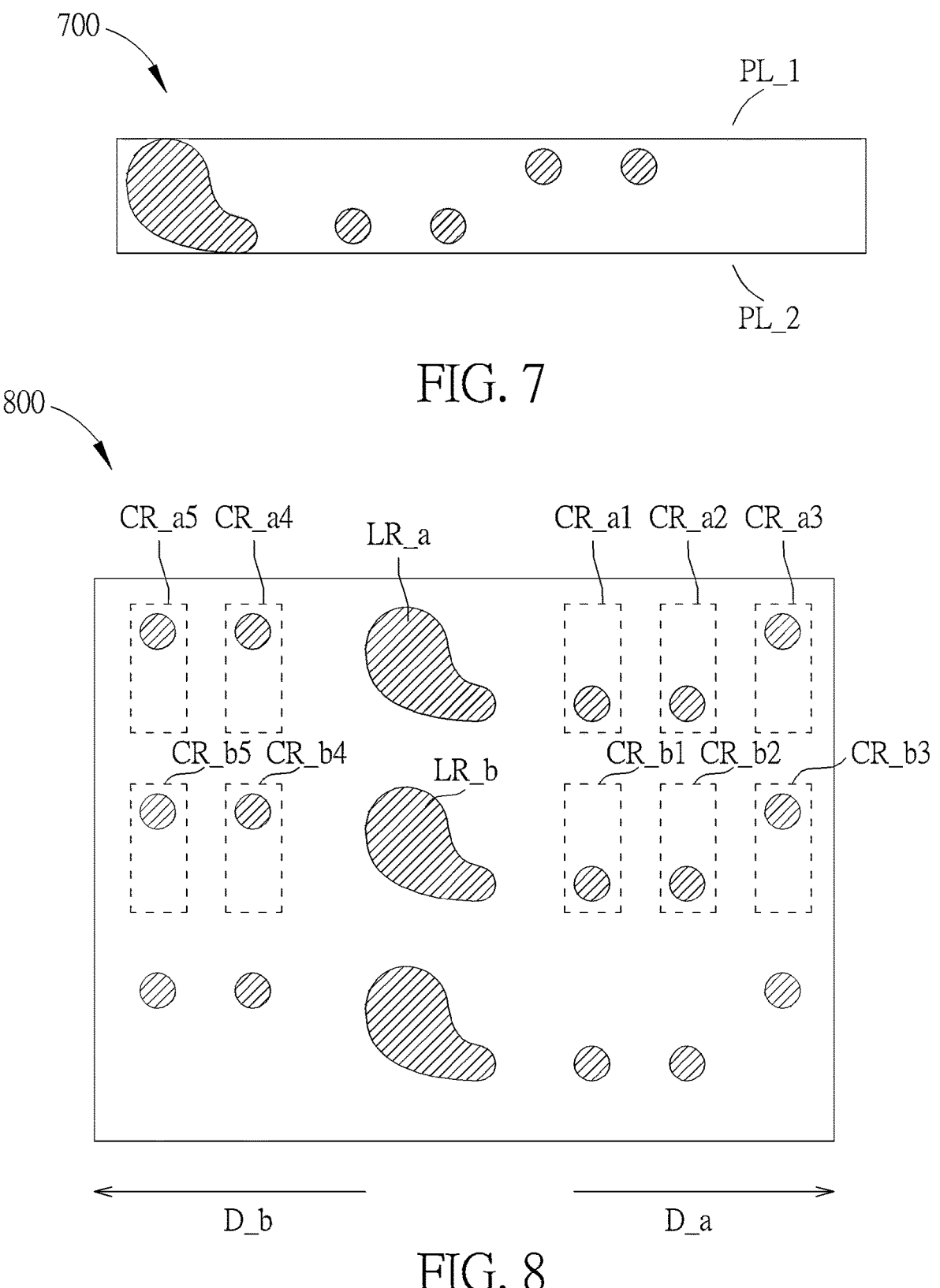

In the embodiment of FIG. 8, which is also an image of the code disclosed in FIG. 5 and FIG. 6, the code is first located according to the location region LR a in the first line or the location region LR b in the second line, and then the code regions CR_a1, CR_a2, CR_a3 in the first line and the code regions CR_b1, CR_b2, CR_b3 in the second line which have identical sequences are combined to a single one of the code regions. Specifically, the code regions CR_a1, CR_a2, CR_a3 in FIG. 8 mean code values 110 and the code regions CR_b1, CR_b2, CR_b3 in FIG. 8 also mean code values 110. However, only one group of code values 110 (i.e., the above-mentioned first code values) is acquired during a decoding procedure the code 800. The code provided by the present invention may further comprise code regions located in more than two lines, as shown in FIG. 8.

Further, in the embodiment of FIG. 8, the code regions CR_a1, CR_a2, CR_a3, CR_b1, CR_b2, CR_b3 are distributed following a first direction D_a and following a second direction D_b of the location region. The first direction D_a and the second direction D_b are opposite. In such embodiment, the code is decoded following the first direction D_a and the second direction D_b, during a decoding procedure the code.

As above-mentioned, the code 800 comprises a plurality of adjacent location regions, such as the location regions LR a and LR b. In such embodiment, the adjacent location regions form a pattern for locating the code regions. Please note, such case can be applied to a case that code regions are provided in a single line, such as the embodiments of FIG. 5, FIG. 6 and FIG. 7, rather than limited to the embodiment shown in FIG. 8.

The sizes of the location regions and the code regions shown in FIG. 5-FIG. 8 may be designed to be very small thus the codes shown in FIG. 5-FIG. 8 may be invisible. Further, the location regions and the code regions shown in FIG. 5-FIG. 8 may be printed in other invisible manners. For example, the location regions and the code regions may be printed in IR painting. In such, the light source contained in the optical decoding device 100 may be an IT light source.

Figure 9:
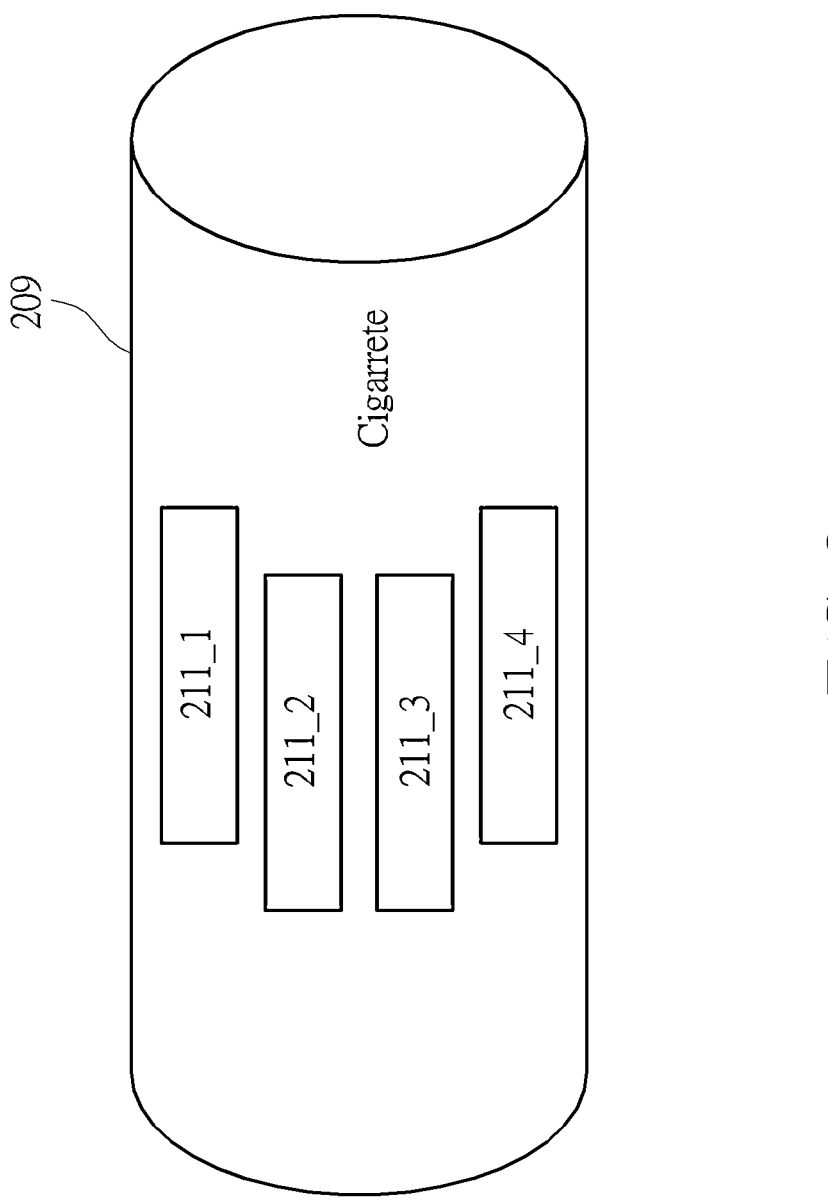
FIG. 9 is a schematic diagram illustrating a cigarette with a plurality of code blocks, according to one embodiment of the present invention.

As above-mentioned, the code or the color code disclosed in afore-mentioned embodiments may be provided on a surface of the cigarette 209 as the code block 211. In the embodiment of FIG. 2, only one code block is provided on the surface of the cigarette 209. However, the code blocks may be provided on the surface of the cigarette 209 in other manners. FIG. 9 is a schematic diagram illustrating a cigarette with a plurality of code blocks, according to one embodiment of the present invention. As shown in FIG. 9, the cigarette 209 comprises a plurality of code blocks 211_1, 211_2, 211_3 and 211_4 repeatedly provided on a surface thereof. By this way, the decoding device 105 may read the correct code more easily.

In view of above-mentioned embodiments, the electrical cigarette lighter may properly heat the cigarette and no manual setting is needed. Also, an optical decoding device which has a decoding device and can save power, a color code which can be provided on a curved surface and an invisible code are provided. Accordingly, the issues of prior art can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An optical decoding device, comprising:
an image sensor, configured to sense first sensing images and second sensing images;

9 a processing circuit, configured to determine a relative movement between the optical decoding device and an object according to the first sensing images; and a decoding device, configured to decode the second sensing images in a first mode to generate a decoding result and does not decode the second sensing images in a second mode;

wherein the processing circuit determines the relative movement while the decoding device operating in the second mode;

wherein the decoding device switches from the second mode to the first mode according to the relative movement.

2. The optical decoding device of claim 1, wherein the processing circuit controls the optical decoding device to switch between a third mode and a fourth mode according to the relative movement, wherein a power consumption of the optical decoding device in the fourth mode is lower than a power consumption of the optical decoding device in the third mode;

wherein processing circuit generates a control signal according to which of the third mode and the fourth mode the optical decoding device operates in to control the decoding device to enter the first mode or the second mode.

3. The optical decoding device of claim 1, applied to a cigarette lighter with a heating device, wherein the heating device does not provide heat in the second mode and the heating device provides the heat according to the decoding result in the first mode.

4. The optical decoding device of claim 1, wherein the second sensing images comprise images of a bar code with at least one first code bar and at least one second code bar, wherein the first code bar and the second code bar represent different code values;

wherein the bar code has a first spacing between the first code bar and a next code of the first code bar;

wherein the bar code has a second spacing between the second code bar and a next code of the second code bar;

wherein a sum of a first width of the first code bar and the first spacing is identical with a sum of a second width of the second code bar and the second spacing.

5. The optical decoding device of claim 1, wherein the second sensing images comprise images of a bar code with at least one first code bar and at least one second code bar, wherein the first code bar and the second code bar represent different code values;

wherein the bar code has a first spacing between the first code bar and a next code of the first code bar;

wherein the bar code has a second spacing between the second code bar and a next code of the second code bar;

wherein a first width of the first code bar and a second width of the second code bar are different;

wherein widths of the first spacing and the second spacing are identical.

6. The optical decoding device of claim 1, wherein the second sensing images comprise images of a code with at least one first code bar and at least one second code bar, wherein the first code bar and the second code bar represent different code values;

wherein the bar code has a first spacing between the first code bar and a next code of the first code bar;

wherein the bar code has a second spacing between the second code bar and a next code of the second code bar;

wherein a first width of the first code bar and a second width of the second code bar are identical;

wherein widths of the first spacing and the second spacing are different.

7. The optical decoding device of claim 1, wherein the second sensing images comprise images of a code with at least one first code bar and at least one second code bar, wherein the first code bar and the second code bar represent different code values;

wherein the first code bar or the second code bar comprises a plurality of discontinuous sub code bars;

wherein the sub code bars are distributed in a direction perpendicular to a decoding direction of the bar code.

8. An optical decoding device, comprising:

an image sensor, configured to sense first sensing images and second sensing images, wherein the second sensing image comprises images of a color code;

a processing circuit, configured to determine a relative movement between the optical decoding device and an object according to the first sensing images; and a decoding device, configured to decode the second sensing images in a first mode to generate a decoding result and does not decode the second sensing images in a second mode;

wherein the color code comprises:

a location region with a first color;

a plurality of code regions, wherein each one of the code regions comprises a first sub code region and a second sub code region;

wherein in each of the code regions, at least one of the first sub code region and the second sub code region has a second color;

wherein a code value of each one of the code regions is determined by which one of the first sub code region and the second sub code region thereof has the second color.

9. The optical decoding device of claim 8, wherein one of the first sub code region and the second sub code region has the second color and the other one of the first sub code region and the second sub code region has a color different from the second color.

10. The optical decoding device of claim 9, wherein colors of the first sub code region which does not have the second color and the second sub code region which does not have the second color of different ones of the code regions are different.

11. The optical decoding device of claim 8, wherein locations of the first sub code region and the second cub code region are determined according to a position or a shape of the location region;

wherein a distribution of the location region and the code regions follows a first side and a distribution of the first sub code region and the second sub code region in a single one of the code region follows a second side perpendicular to the first side; and, wherein the second side is shorter than the first side.

12. The optical decoding device of claim 8, wherein the first color and the second color are identical colors.

13. The optical decoding device of claim 8, wherein a decoding direction of the color code is from the location region to the code regions.

14. An optical decoding device comprising:

an image sensor, configured to sense first sensing images and second sensing images, wherein the second sensing image comprises images of a code;

a processing circuit, configured to determine a relative movement between the optical decoding device and an object according to the first sensing images; and a decoding device, configured to decode the second sensing images in a first mode to generate a decoding result and does not decode the second sensing images in a second mode;

wherein the code comprises:

at least one location region, for locating the code; and a plurality of code regions, wherein each one of the code regions comprises a sub code region representing a first code value, wherein the first code value of each of the code regions is determined according to a position of at least one of the sub code region in the code regions.

15. The optical decoding device of claim 14, wherein the location region is for representing a second code value, wherein the second code value is determined according to a shape or a color of the location region.

16. The optical decoding device of claim 14, wherein a first code region among the code regions has the first code value with a first value if the sub code region of the first code region is in an upper region of the first code region, wherein a second code region among the code region has the first code value with a second value if the sub code region of the second code region is in a lower region of the second code region;

wherein the location region is located between the upper region and the lower region.

17. The optical decoding device of claim 14, wherein the first code value is determined by a relation of positions of the sub code region of two neighboring ones of the code regions.

18. The optical decoding device of claim 14, wherein the code comprises the location region and the code regions in a first line and the location region and the code regions in a second line;

wherein the code is first located according to the location region in the first line or the second line, and then the code regions in the first line and the code regions in the second line which have identical sequences are combined to a single one of the code regions and then used for determining the first code value, during a decoding procedure the code.

19. The optical decoding device of claim 18, wherein the code regions are distributed following a first direction and following a second direction of the location region, wherein the first direction and the second direction are opposite;

wherein the code is decoded following the first direction and the second direction, during a decoding procedure the code.

20. The optical decoding device of claim 14, wherein the code comprises a plurality of the location regions which are adjacent to each other, wherein the location regions which are adjacent to each other form a pattern for locating the code regions.

* * * * *